Oct. 28, 1947. C. E. KENNEY ET AL 2,429,936
TURBINE MOUNTING
Filed Dec. 18, 1943
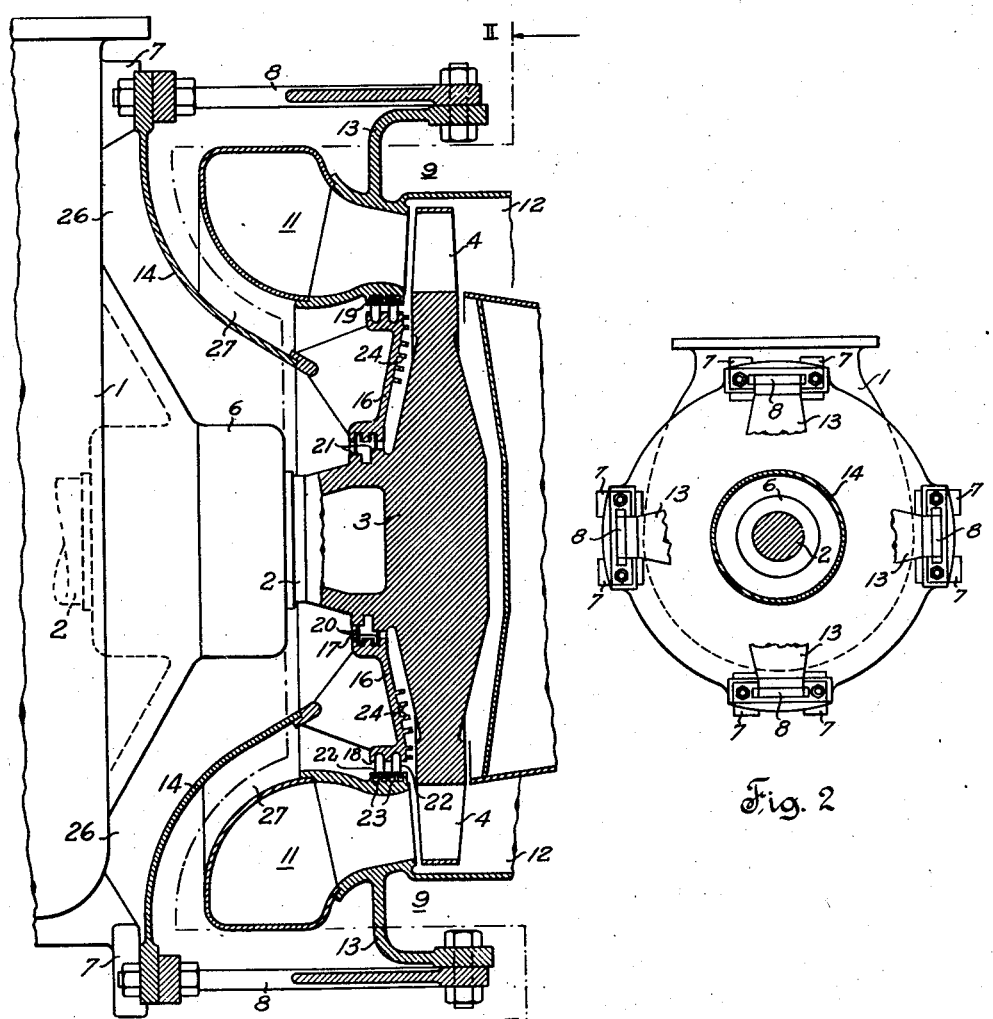
Fig. 1
Fig. 2
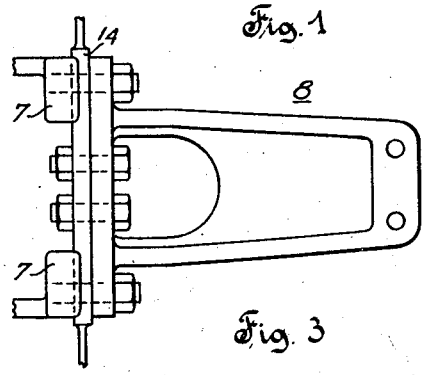
Fig. 3
Inventors
C. E. Kenney
J. R. Hagemann
by K. A. Wyman
Attorney Patented Oct. 28, 1947

2,429,936

UNITED STATES PATENT OFFICE 2,429,936

TURBINE MOUNTING

Clarence E. Kenney, West Allis, and John R. Hagemann, Wauwatosa, Wis., assignors to Allis-Chalmers Manufacturing Company, Milwaukee, Wis., a corporation of Delaware Application December 18, 1943, Serial No. 514,808

8 Claims. (Cl. 253—39)

This invention relates to elastic fluid turbines and has for its primary object the provision of an improved mounting for nozzle structures which is effective to confine expansion and contraction to those parts subjected to large variations in temperature and thereby prevent the overstressing, straining and distortion of interconnected parts.

A further object of this invention is to provide an improved nozzle mounting and seal structure which, in addition to preventing the overstressing, straining and distortion of interconnected parts, is also effective to maintain desired and predetermined sealing clearances in order to restrict and minimize the flow of high temperature motive fluid into contact with parts which might be damaged if heated excessively.

In accordance with the broad aspect of this invention, the previously stated primary object invention may be accomplished in whole or in part in any turbine structure embodying a blade carrying spindle disk or rotor and an annular nozzle means simply by providing a plurality of fixedly mounted members presenting radially flexible free end portions disposed in coaxial spaced relation with respect to the rotor axis and by mounting the annular nozzle means on the free end portions of the radially flexible members in operative coaxial relation to the blade carrying portion of the rotor.

The manner in which the previously stated further object may be accomplished in whole or in part will become apparent as the disclosure progresses and particularly emphasizes other salient features characterizing the invention. Accordingly, the invention may be considered as consisting of the various details of construction, correlations of features, and arrangements of parts as is more fully set forth in the appended claims and in the detailed description, in which:

Fig. 1 illustrates in part longitudinal section, a single stage gas turbine embodying the invention;

Fig. 2 is a section taken on line II—II of Fig. 1; and

Fig. 3 is an enlarged plan view of one of the nozzle structure supporting members.

Referring to the drawing, it is seen that the invention may be applied to a supercharger aggregate including a compressor casing 1 enclosing a compressor rotor (not shown) having a coaxial shaft portion 2 integral with a coaxial single stage gas turbine spindle or rotor disk 3 provided with blades 4 and rotatably supported in a bearing 6 fixedly mounted on the casing 1. In other words, the turbine rotor has a coaxial shaft portion 2 rotatably supported in a bearing which is carried by the compressor casing and which in turn constitutes a fixed support in so far as the supercharger aggregate is concerned.

The turbine side of casing 1 is provided with a series of circumferentially spaced bosses or the like 7 to each of which is bolted or otherwise secured one end of an elongated axially extending flat member or strut 8; said members presenting free end portions which are disposed in coaxial spaced relation with respect to the turbine and which are substantially rigid in a circumferential direction and flexible in a radial direction relative to the turbine axis or rotor. Stated differently, the free end portions of the members are substantially rigid in a tangential direction relative to a circle concentric to the axis of the turbine and flexible in a radial direction relative to said axis. The members 8 although preferably shaped as best shown in Fig. 3, may be formed and shaped in any desired manner; the only requisite being that the free end portions of the members be substantially rigid and flexible as previously stated.

The blade carrying portion of the rotor 3 is enclosed in an integral casing structure 9 including a combined annular inlet manifold and nozzle portion 11, an annular exhaust portion or conduit forming means 12, and a plurality of radially projecting circumferentially spaced arms or the like 13 having their outer free ends bolted or otherwise secured to the free end portions of the members 8 which, as previously indicated, are free to flex outward as said integral structure expands radially. Each flat member or strut 8 aligns the integral manifold, nozzle and exhaust structure in a plane parallel to its longitudinal axis and three or more of such members will operate at all times to maintain said integral structure in operative coaxial relation to the blade carrying portion of the rotor.

Also bolted or otherwise secured to the bosses 7 of compressor casing 1 is a substantially rigid annular or funnel-shaped shield 14 which extends in coaxial spaced relation between the inlet manifold and nozzle portion 11 of casing structure 9 and the opposed parts of the compressor casing 1, the bearing 6 and shaft portion 2; said shield terminating adjacent the side of rotor disk 3 in a radially extending annular flange or disk portion 16 presenting an inner peripheral surface 17 disposed in opposed proximate relation to a part of the shaft portion 2 and an outer peripheral surface 18 disposed in opposed proximate relation to an inner peripheral part 19 of the manifold and nozzle portion 11 of the casing 9.

The inner peripheral surface 17 on flange 16 is provided with axially spaced inwardly projecting seal rings or the like 20 which coact with axially spaced annular sealing surfaces 21 on shaft portion 2 to minimize the flow of hot motive fluid along the shaft portion and toward the bearing 6. The outer peripheral surface 18 on flange 16 is provided with a pair of axially spaced radially projecting U-shaped seal rings 22 each of which extends freely within a pair of axially spaced annular grooves 23 formed in the opposed peripheral part 19 of the manifold and nozzle portion 11. Consequently, the manifold and nozzle portion 11, may expand and contract radially without destroying the effectiveness of the seal provided between the part 19 thereof and the outer peripheral portion of the flange 16. Stated differently, the coacting U-shaped seal rings 22 and grooves 23 provide means for effectively sealing opposed parts of the shield 14 and casing 9 for relative radial movement. In addition, since the only connection provided between the inlet manifold and nozzle portion 11 and the flange 16 of shield 14 is that afforded by the U-shaped seal rings 22, the direct flow of heat to and consequently the temperature of the flange 16 of shield 14 is maintained at a minimum thereby materially cooling the hot gas entering the space between said flange and the opposed side surface of the turbine disk. In order to more rapidly dissipate heat from the turbine disk and from the gases entering the space between the latter and the annular flange 16 on shield 14, the disk side of the flange is preferably provided with a series of radially spaced annular corrugations or ribs 24.

In addition to shielding the compressor casing 1, the bearing 6 and the shaft portion 2 of the turbine rotor 3 from the radiant heat emitted from the combined inlet manifold and nozzle means 11, the shield 14 also defines with said parts cooling fluid passages 26 and 27 through which air circulates and cools said parts. The shield 14 may be fixedly mounted on any suitable supporting means and although in the illustrated application the compressor casing 1 does provide a convenient support which in addition to mounting the shield 16 is also used for mounting both the bearing 6 and the flexible members 8 supporting the casing structure 9, it should be understood that the only requisite in this connection is that the members 8 and shield 14 be fixedly mounted to coact in the manner hereinbefore stated.

Moreover, it should also be understood that the members 8 may be fixedly mounted on any suitable support or supports providing their radially flexible free end portions are disposed in coaxial spaced relation about the axis of the turbine and providing that the casing structure is mounted on the free end portions of the members 8 in operative coaxial relation to the blade carrying portion of the turbine disk or rotor, that any suitable form of sealing means may be employed between the flange 16 on shield 14 and the opposed parts of the casing structure and shaft portion, that the turbine may be either a single or multistage turbine, and that it is not intended to limit the invention to either the combinations of elements or the exact details of construction herein shown and described as various modifications within the scope of the accompanying claims may occur to persons skilled in the art.

It is claimed and desired to secure by Letters Patent:

1. In combination in a turbine apparatus embodying a fixedly mounted bearing, a blade carrying rotor having a coaxial shaft portion rotatably supported in said bearing, and a fixed support, a plurality of members carried by and extending from said fixed support with their free ends disposed in coaxial spaced relation to the turbine rotor, said members being substantially rigid in a circumferential direction and flexible in a radial direction relative to the turbine axis, a combined annular inlet manifold and nozzle structure coaxially supported by the free end portions of said members in spaced surrounding relation with respect to said shaft portion with the nozzle opposing the blade carrying portion of the rotor and for substantially free radial movement both toward and away from the axis of the rotor as the combined structure expands and contracts in response to temperature changes, a substantially rigid annular shield fixedly mounted on said support to extend in coaxially spaced relation between said nozzle structure and the opposed parts of said fixed support, bearing, and shaft portion, said shield terminating in a disk portion presenting inner and outer peripheral surfaces disposed in opposed proximate spaced relation with respect to a part of said shaft portion and with respect to a part of said structure, respectively, and means sealing said inner surface and the opposed part of said shaft portion and sealing said outer surface and the opposed part of said combined structure for relative radial movement.

2. In combination in a turbine apparatus embodying a supporting structure, a bearing mounted on said structure, and a blade carrying rotor having a coaxial shaft portion rotatably supported in said bearing, an annular nozzle-including casing structure, flexible means carried by said supporting structure and bodily mounting said casing structure in spaced relation with respect to said supporting structure and in partially enclosing, spaced relation with respect to the blade carrying portion of said rotor, with respect to said bearing, and with respect to an exposed part of said shaft portion, an annular shield carried by said supporting structure to extend between the opposed parts of said bearing and casing structure, said shield terminating in a disk portion spacedly opposing a side of the blade carrying portion of said rotor and presenting inner and outer peripheral edge surfaces spaced from the opposing surfaces of said shaft part and casing structure, and seal means coacting with said opposed surfaces in a manner permitting a relative radial movement of said shaft portion, shield and casing structure.

3. In combination in a turbine apparatus embodying a supporting structure, a bearing mounted on said structure, and a blade carrying rotor having a coaxial shaft portion rotatably supported in said bearing, a plurality of members mounted on said supporting structure and presenting free end portions disposed in spaced coaxial relation with respect to said rotor and bearing, and an annular nozzle-including casing structure carried by the free end portions of said members in partially enclosing, spaced relation with respect to the blade carrying portion of said rotor, with respect to said bearing, and with respect to an exposed part of said shaft portion, said members being flexible radially relative to the axis of said rotor and bodily supporting said casing structure for substantially unrestricted expansion and contraction relative to said supporting structure, bearing and rotor, an annular shield carried by said supporting structure to extend between the opposed parts of said bearing and casing structure, said shield terminating in a disk portion spacedly opposing a side of the blade carrying portion of said rotor and presenting inner and outer peripheral edge surfaces spaced from the opposing surfaces of said shaft part and casing structure, and seal means coacting with said opposed surfaces in a manner permitting a relative radial movement of said shaft portion, shield and casing structure.

4. In combination in a turbine apparatus including a blade carrying rotor and a supporting structure therefor, a plurality of members carried by parts of said structure and presenting radially flexible free end portions disposed in spaced symmetrical relation with respect to said rotor, and an annular casing structure supportedly attached to and bodily carried by the flexible free end portions of said members in detached freely expandable relation with respect to all other parts of said supporting structure and in partially enclosing spaced operative relation with respect to the blade carrying portion of said rotor.

5. In combination in a turbine apparatus including a blade carrying rotor and a supporting structure therefor, a plurality of members carried by external parts of said structure remote from the rotor axis and presenting radially flexible free end portions symmetrically arranged in spaced surrounding relation with respect to the outer periphery of said rotor, and an annular gas confining and directing casing structure supportedly attached to and bodily carried by the flexible free end portions of said members in spaced relation with respect to said rotor and in detached freely expandable relation with respect to all other parts of said supporting structure, said annular casing structure including a portion concentrically surrounding the tips of the blades mounted on said rotor in fluid confining relation thereto and including a nozzle portion disposed in spaced opposed fluid directing relation with respect to the admission edges of the rotor mounted blades.

6. In combination in a turbine apparatus including a blade carrying rotor and a supporting structure therefor, a plurality of axially extending members carried by said structure and presenting radially flexible free end portions disposed in spaced symmetrical relation with respect to said rotor, and an annular nozzle including casing structure having circumferentially spaced outer peripheral portions thereof supportedly attached to and bodily carried by the flexible free end portions of said members in spaced freely expandable relation with respect to all of said supporting structure and rotor, said annular casing structure including a portion disposed in surrounding fluid confining relation with respect to the tip periphery of the rotor mounted blades and including a nozzle portion disposed in spaced opposed fluid directing relation with respect to the fluid admission edges of said blades.

7. In combination in a turbine apparatus including a blade carrying rotor and a supporting structure therefor, a plurality of axially extending members carried by external parts of said structure remote from the rotor axis and presenting radially flexible free end portions symmetrically arranged in spaced surrounding relation with respect to the outer periphery of said rotor, and an annular casing structure having circumferentially spaced outer peripheral portions thereof supportedly attached to the flexible free end portions of said members and being bodily carried and positioned thereby in spaced relation with respect to said rotor and in detached freely expandable relation with respect to all other parts of said supporting structure, said casing structure including a portion surrounding the tip periphery of the rotor mounted blades in fluid confining relation thereto and including a nozzle portion opposing said rotor mounted blades in fluid directing relation thereto.

8. In combination in a turbine apparatus including a supporting structure, a bearing mounted on said supporting structure, and a blade carrying rotor having a coaxial shaft portion rotatably supported in said bearing, a plurality of members carried by said structure and presenting free end portions disposed in spaced symmetrical relation with respect to said rotor, an annular casing structure carried by the free end portions of said member in spaced relation with respect to said supporting structure and in partially enclosing spaced relation with respect to the blade carrying portion of said rotor, with respect to said bearing, and with respect to an exposed part of said shaft portion, said members being flexible radially relative to the rotor axis and bodily supporting said casing structure for substantially unrestricted expansion and contraction relative to said supporting structure and relative to said rotor, an annular shield fixedly carried by said supporting structure to extend between said exposed shaft portion and casing structure, said shield presenting inner and outer edge surfaces spaced from the opposing surfaces of said shaft part and casing structure, and seal means coacting with said opposed surfaces in a manner permitting a relative radial movement of said shaft portion, shield and casing structure.

CLARENCE E. KENNEY.
JOHN R. HAGEMANN.

REFERENCES CITED

The following references are of record in the file of this patent:

UNITED STATES PATENTS

| Number | Name | Date |
| --- | --- | --- |
| 2,117,131 | Auger | May 10, 1938 |
| 2,180,168 | Puffer | Nov. 14, 1939 |
| 2,184,197 | Schutte | Dec. 19, 1939 |
| 2,269,181 | Clark | Jan. 6, 1942 |
| 2,296,701 | Butler | Sept. 22, 1942 |
| 2,309,003 | Norris | Jan. 19, 1943 |
| 2,283,176 | Birmann | May 19, 1942 |
| 1,889,554 | Kennedy | Nov. 29, 1932 |